(No Model.)
L. H. WARD.
WHEEL CHECK ROWER AND DRILL COMBINED.
No. 369,974. Patented Sept. 13, 1887.
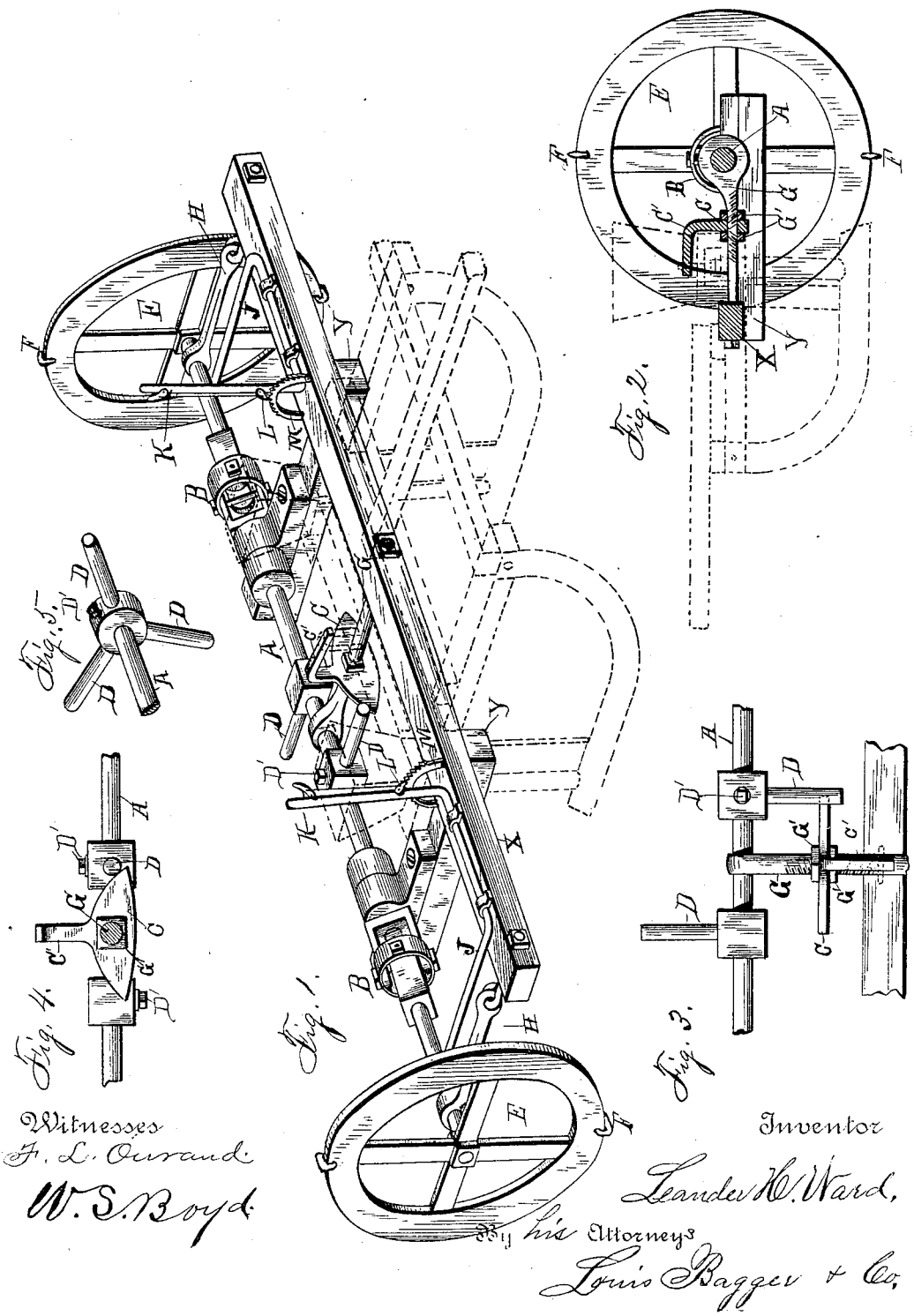

UNITED STATES PATENT OFFICE.

LEANDER H. WARD, OF WALNUT, OHIO.

WHEEL CHECK-ROWER AND DRILL COMBINED.

SPECIFICATION forming part of Letters Patent No. 369,974, dated September 13, 1887.

Application filed March 22, 1887. Serial No. 232,044. (No model.)

*To all whom it may concern:*

Be it known that I, LEANDER H. WARD, a citizen of the United States, residing at the township of Walnut, in the county of Pickaway, and in the State of Ohio, and whose post-office address is Ashville, Pickaway county, Ohio, have invented a certain new and useful Wheel Check-Rower and Drill Combined to Attach to Seed-Planters; and I do hereby declare that the following is a full, clear, and exact description of the invention, which will enable others skilled in the art to which it appertains to make and use the same.

This invention is intended as an attachment to seed-planters for the purpose of automatically dropping seed in rows or drills, as may be desired.

Figure 1 is a perspective view of my improvement attached to a corn-dropper, the dropper being shown in dotted lines. Fig. 2 is a central vertical sectional view of the same. Fig. 3 is a top plan view of the mechanism for operating the dropper-slide. Fig. 4 is a front view of the same, and Fig. 5 is a perspective view of a portion of the same arranged for planting the corn in drills.

In the accompanying drawings, in which the same letters of reference indicate corresponding parts in all the figures, I have shown my improvement secured upon the sleds or runners of an ordinary corn-planter, provided with the means for drawing it across the field and holding and dropping the seed or grain as it progresses; but, as these are of any desirable ordinary make or construction, they are only shown in dotted lines in the drawings. A cross-piece, X, is secured upon these sleds. Two side rails or supports, Y Y, are secured at their forward ends to this cross-piece and extend rearwardly at the sides of the dropper. An axle, A, is journaled across the rear ends of these side rails, the outer ends of the axle being provided with the wheels E E, each of which is provided upon its periphery with the lugs or markers F F. The axle is provided with two universal joints, B B, one between each sled or runner and the wheel at that end of the axle, which thus permits of the planter passing over uneven ground without raising the wheels or the sleds out of contact with it.

Near each end of the beam or cross-piece X a bar, H, is pivotally secured at one end, and the other end of said bar is provided with a bearing, in which the portion of the axle between the wheel and the universal joint is journaled, which thus keeps the axle in a straight line transversely, but at the same time allows a perfectly free movement of the wheels horizontally. Pivotally secured upon the top of the beam X, near its ends, are two rods or levers, J J, the outer ends of which are bent at right angles and extended back underneath the ends of the axle between the wheels and the universal joint, by means of which the wheels can be raised out of the ground to pass from one field to another by pressing down upon the other ends of these rods or levers, which are bent to form handles, as shown at K. Spring-catches L L engage with racks M M and hold the handles down and the rear portion of the levers and the wheels up.

At the middle of the beam X the rod G is secured at one end, the rear end of the rod being provided with a bearing in which the middle portion of the axle is journaled. A cam-rocker, C, is pivotally secured upon this rod, preferably by means of a nut upon each side of it, and has a lug or extension, C', projecting from it, by means of which the rocker connects with and operates the dropper rod or shaft, the ends of which connect with and slide in the seed-boxes. Secured upon the axle A, at each side of the rod G, are two or more arms, D D, the ends of which engage with the ends of the rocker C C as the axle revolves, the arms striking the ends of the rocker alternately, which causes it to move back and forth, and thus drop the seeds at the proper intervals. By having a series of arms, as shown in Fig. 4, secured upon the axle upon each side of the rod, the rocker can be made to operate fast enough to drill the corn, instead of dropping it in hills, as is done when arranged as shown in Fig. 1. By securing these arms by means of set-screws D', they can be arranged in position as desired, as by placing them farther from the rods G they will strike at the extreme outer ends of the rocker, which will only cause it to move a slight distance, or by placing them closer to the rod they will strike closer to the pivotal point of the rocker, and thus cause it to move a greater distance, and with it the dropper attachment; or the same result can be attained by securing the rocker nearer to or farther from the axle by means of the nuts G' upon each side of it. By arranging these arms in such relation to the lugs upon the driving-wheels and to each other, the lugs can be made to enter the ground in line with the hills as they are dropped by the machine, thus always indicating to the operator the exact position of the hills, by means of which he is enabled to so arrange the device as to always cause the hills to be in a line with each other, so that the corn can be cultivated both ways. As the attachment can be readily applied to machines already in the market with but very little change, and it is very desirable for machines which have been made to operate by hand, or which have for any reason become inoperative or undesirable; or the attachment can be applied to new machines and sold and used directly therewith.

Having thus described my invention, I claim and desire to secure by Letters Patent of the United States—

1. In an attachment to seed-planters having the ordinary sleds and dropper attachments, and the axle of which is provided with universal joints, the combination of a cross-beam secured upon the front portion of the sleds, bars pivotally secured at one end to the ends of the cross-beam, and having bearings at the opposite ends, levers pivotally secured at the ends of said cross-piece, the outer ends of which are bent at right angles and extended back under the ends of the axle, and the opposite ends of said lever are bent to form handles, spring-latches, racks, and means, substantially as described, for operating the dropping mechanism.

2. In an attachment to seed-planters having the ordinary sleds and dropping attachments, and the axle of which is provided with universal joints, the combination of a cross-piece secured upon the front portion of the sleds, a bar secured to the middle of the cross-piece, having a bearing at the rear end, a cam-rocker adjustably and pivotally secured upon said bar, having a lug or extension upon one side, operating-arms adjustably secured upon the axle, the ends of which engage the ends of the rocker, and means, substantially as described, for connecting the rocker with the dropping attachment and for raising and lowering the wheels upon the ends of the axle.

LEANDER H. WARD.

Witnesses:
SAMUEL W. COURTRIGHT,
EDWARD W. COURTRIGHT.